(12) United States Patent
Fukuda

(10) Patent No.: US 8,780,955 B2
(45) Date of Patent: Jul. 15, 2014

(54) SIGNAL PROCESSING APPARATUS, RADAR APPARATUS, AND SIGNAL PROCESSING METHOD

(71) Applicant: Panasonic Corporation, Osaka (JP)

(72) Inventor: Takeshi Fukuda, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 14/036,087

(22) Filed: Sep. 25, 2013

(65) Prior Publication Data
US 2014/0023120 A1 Jan. 23, 2014

Related U.S. Application Data

(63) Continuation of application No. PCT/JP2012/006339, filed on Oct. 3, 2012.

(30) Foreign Application Priority Data

Oct. 7, 2011 (JP) ................................. 2011-222471

(51) Int. Cl.
H04B 1/00 (2006.01)

(52) U.S. Cl.
USPC ............ 375/140; 375/142; 375/150; 375/343

(58) Field of Classification Search
USPC .................. 375/130, 134, 140, 142, 150, 343, 375/136–137
See application file for complete search history.

(56) References Cited

U.S. PATENT DOCUMENTS 7,430,233 B2   9/2008  Suzuki et al.
7,642,952 B2   1/2010  Fukuda
2002/0150150 A1* 10/2002 Kohli et al. .................. 375/150
2004/0156452 A1   8/2004  Suzuki et al.
2009/0015464 A1   1/2009  Fukuda

FOREIGN PATENT DOCUMENTS

| JP | 62-054189 | 3/1987 |
| JP | 62-054190 | 3/1987 |
| JP | 62-054191 | 3/1987 |
| JP | 01-319862 | 12/1989 |
| JP | 07-325149 | 12/1995 |
| JP | 09-054156 | 2/1997 |
| JP | 09-264949 | 10/1997 |
| JP | 10-145330 | 5/1998 |
| JP | 2000-009833 | 1/2000 |
| JP | 2005-057441 | 3/2005 |
| WO | 2006/106774 | 10/2006 |

OTHER PUBLICATIONS

International Search Report issued Nov. 20, 2012 in International (PCT) Application No. PCT/JP2012/006339.

* cited by examiner

Primary Examiner — Curtis Odom
(74) Attorney, Agent, or Firm — Wenderoth, Lind & Ponack, L.L.P.

(57) ABSTRACT

A signal processing apparatus which calculates a correlation value between an input analog signal and a digital code includes: an adder which adds a noise signal to the analog signal; an analog comparator which compares, synchronously with a clock signal having a first period, a magnitude of the analog signal added with the noise signal with a reference voltage; a multiplier which receives an input of a comparison result from the analog comparator and the digital code and calculates, synchronously with the clock signal, an exclusive OR between the comparison result and the digital code; and a counter which accumulates calculation results from the multiplier over a second period in a time series, and calculates, as the correlation value, a difference between an accumulation result and one-half of a quotient of the second period and the first period.

7 Claims, 10 Drawing Sheets

SIGNAL PROCESSING APPARATUS, RADAR APPARATUS, AND SIGNAL PROCESSING METHOD

CROSS REFERENCE TO RELATED APPLICATIONS

This is a continuation application of PCT International Application No. PCT/JP2012/006339 filed on Oct. 3, 2012, designating the United States of America, which is based on and claims priority of Japanese Patent Application No. 2011-222471 filed on Oct. 7, 2011. The entire disclosures of the above-identified applications, including the specifications, drawings and claims are incorporated herein by reference in their entirety.

FIELD

One or more exemplary embodiments disclosed herein relate generally to signal processing apparatuses which calculate a correlation value between an input analog signal and a given digital code.

BACKGROUND

Technological development of radar apparatuses integrated into automobiles (hereinafter referred to as automobile radar apparatuses) has been dramatic in recent years. Proposed examples include radar apparatuses which use spread spectrum techniques (hereinafter referred to as spread spectrum radar apparatuses) (for example, see Patent Literature PTL 1 and PTL 2),

CITATION LIST

Patent Literature

[PTL 1] WO 2006/106774
[PTL 2] Japanese Unexamined Patent Application Publication No. 2000-009833

SUMMARY

Technical Problem

However, the above configurations are problematic in that use of a high speed and high resolution AD converter is required.

Solution to Problem

In one general aspect, the techniques disclosed here feature a signal processing apparatus which calculates a correlation value between an input analog signal and a given digital code, the signal processing apparatus including: a noise adder which adds a noise signal to the analog signal; a comparator which compares, synchronously with a clock signal having a first period, a magnitude of the analog signal added with the noise signal with a magnitude of a given voltage; a multiplier which receives an input of a comparison result from the comparator and the given digital code and calculates, synchronously with the clock signal, an exclusive OR between the comparison result and the given digital code; and a counter which accumulates calculation results from the multiplier over a second period in a time series, and calculates, as the correlation value, a difference between an accumulation result and one-half of a quotient of the second period and the first period.

It should be noted that these general and specific aspects may be implemented as a method.

Advantageous Effects

The signal processing apparatus according to one or more exemplary embodiments or features disclosed herein is capable of calculating a correlation between an analog signal and a digital code which operate in a large dynamic range without the use of a high cost, high power consuming, high speed, and high resolution AD converter.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Underlying Knowledge Forming Basis of the Present Disclosure

In relation to the automobile radar apparatus disclosed in the Background section, the inventors have found the following points to be problematic at the present time:

The automobile radar apparatus detects objects (vehicles, people, etc.) to prevent accidents from occurring. The automobile radar apparatus also assists the driver by detecting objects present behind the host vehicle when the driver is driving the host vehicle in reverse. With these goals in mind, when the host vehicle and a different vehicle are both equipped with the same type of radar apparatus, the electromagnetic waves output by the radar apparatuses cause interference. It is necessary to suppress the influence of unwanted radio waves resulting from the interference.

In contrast, since radio waves to be transmitted are modulated in spread spectrum radar apparatuses using a PN code for spreading, radio waves modulated using a different code as well as radio waves from radar apparatuses using a different scheme with no code modulation are suppressed within the receiver.

Moreover, since the radio waves to be transmitted are frequency-spread using a PN code, it is possible to minimize the electric power per unit frequency and thus to reduce the influence on other wireless systems. It is also possible to freely set a relationship between distance resolution and maximum detectable range by adjusting the chip rate and code period of the PN code. Moreover, since continuous transmission of electromagnetic waves is possible, peak power will not increase. However, even if despreading is performed, unwanted radio waves mixed in during radio wave propagation are spread across a wide band in a frequency region and unwanted noise or interference signals are suppressed using a narrow band filter.

Figure 8:
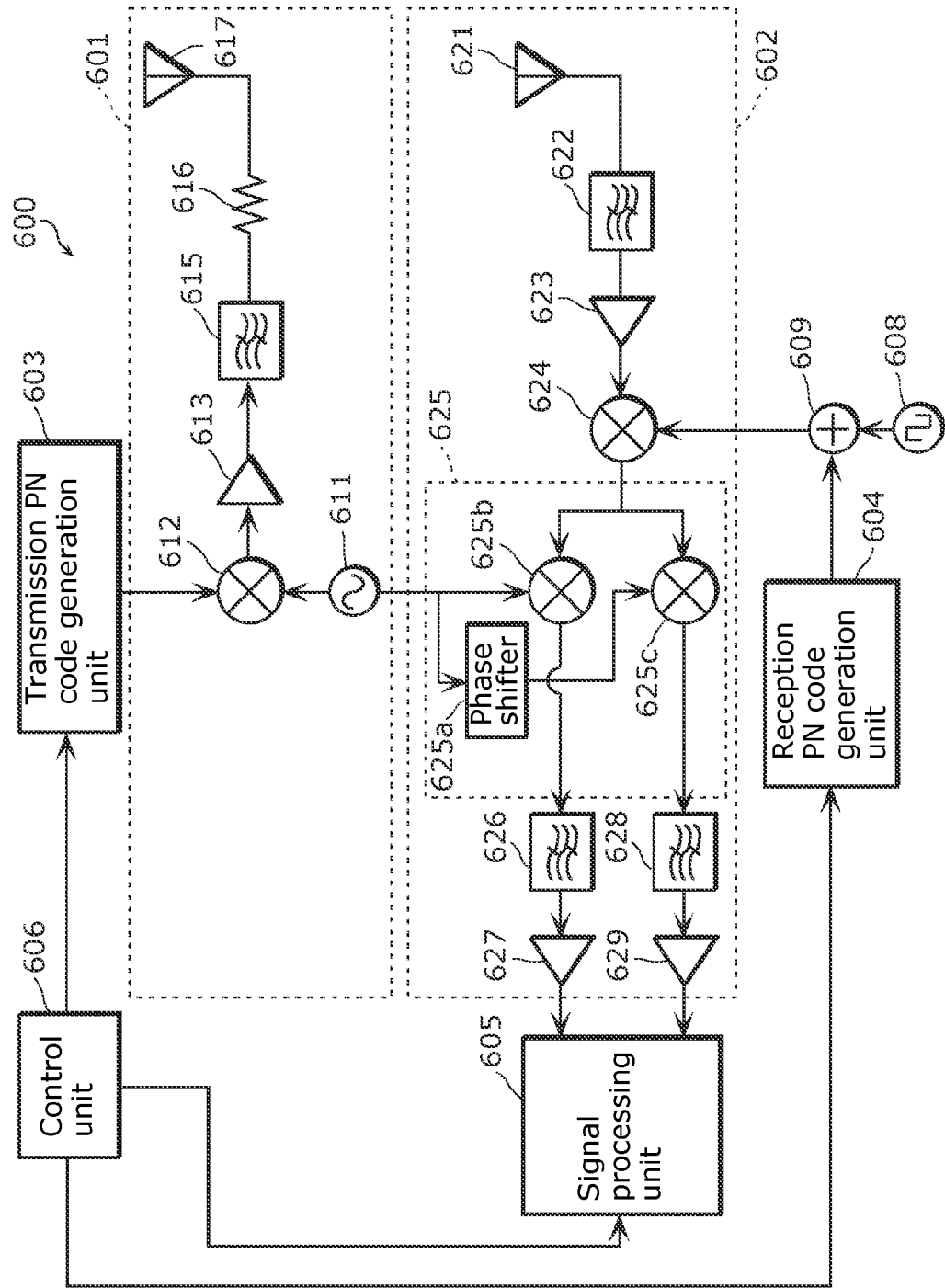
FIG. 8 is a block diagram showing the configuration of a conventional spread spectrum radar apparatus.

FIG. 8 is a block diagram showing the configuration of a conventional spread spectrum radar apparatus.

As shown in FIG. 8, the radar apparatus 600 includes a transmission PN code generation unit 603, a transmission unit 601, a reception unit 602, a reception PN code generation unit 604, a cycle code generator 608, an eXclusive OR (XOR) operator 609, a signal processing unit 605, and a control unit 606.

The transmission unit 601 includes a local oscillator 611, a balanced modulator 612, an amplifier 613, a band pass filter 615, an attenuator 616, and a transmission antenna 617.

The reception unit 602 includes a reception antenna 621, a band pass filter 622, a low noise amplifier 623, a balanced modulator 624, a quadrature demodulator 625, band pass filters 626 and 628, and amplifiers 627 and 629.

The quadrature demodulator 625 includes a phase shifter 625a and balanced modulators 625b and 625c.

The transmission unit 601 generates a modulation signal from the output of the local oscillator 611 and the transmission code generated by the transmission PN code generation unit 603.

The local oscillator 611 outputs a narrow band signal. The modulation signal is frequency-spread across a wide band by using a code having a high bit rate as the transmission PN code.

This modulation signal passes through amplifier 613, the band pass filter 615, and the attenuator 616, and is radiated into the air as a detection radio wave from the transmission antenna 617.

The detection radio wave reflected back from an object is received as a reception signal by the reception unit 602. More specifically, the reception antenna 621 receives the reception signal.

After the reception signal is filtered of unwanted waves outside the band by the band pass filter 622, the reception signal is input into the balanced modulator 624 through the low noise amplifier 623.

A reception correlation code obtained by delaying an output of the transmission PN code generation unit 603 is generated by the reception PN code generation unit 604, and an XOR of the cycle code generator 608 is output from the XOR operator 609 as the despreading code.

The reception signal is despread by the balanced modulator 624 using the despreading code and frequency transformed by the quadrature demodulator 625 to generate two types of baseband signals, I and Q.

The phase of the transmission PN code included as the modulation signal in the reception signal is time-delayed from the transmission output according to the distance from an object, but when an amount of time-delay between the reception correlation code and the transmission PN code and an amount of delay of the phase of the transmission PN code included in the reception signal match, in other words, when there is correlation between the reception signal and the reception correlation code (correlation), a signal having the same output waveform as the cycle code generator 608 is generated as the baseband signal, and when the time-delay does not match, in other words, when there is no correlation (noncorrelation), a signal that is frequency-spread over a wide band is generated.

When the cycle code generator 608 and the XOR operator 609 are not provided, in other words, when the reception correlation code is directly input into the balanced modulator 624, the baseband signal output frequency in the case of correlation only becomes a direct current component whereby the radar apparatus is subject to influence from circuit direct current offset. As such, the cycle code generator 608 and the XOR operator 609 are provided to prevent this disadvantage.

The band pass filters 626 and 628 are designed to selectively pass the fundamental waves or harmonic waves of the cycle code generator 608 whereby the reception signal having a propagation delay time equal to the delay time between the reception correlation code and the transmission PN code is selectively transmitted to the signal processing unit 605. By the control unit 606 successively sweeping $\tau$ when the relationship $\tau=2R/c$ where c is light speed, R is the distance from the radar apparatus 600 to an object, and $\tau$ is the time-delay set between the reception correlation code and the transmission PN code, the signal processing unit 605 can obtain the strength and phase of the reflection signal relative to the distance R. The signal processing unit 605 further estimates the distance of an object based on the signal strength for each distance, and estimates a relative traveling speed of an object by measuring the temporal change in phase for each distance.

Here, even when there are signals as input signals other than the detection radio wave radiated by the radar apparatus 600 that are unwanted, except in the case when there is correlation with the transmission PN code, the signals are baseband signals that are spread over a wide band, and as such, are suppressed by the band pass filters 626 and 628. This is one superior feature of the spread spectrum radar apparatus.

However, with a spread spectrum radar apparatus having a conventional configuration, a problem arises that time is required to sweep the reception correlation code to thoroughly measure a concerned range of distance. When a faster sweeping rate is desired, the passband width of the band pass filter 626 and 628 must be set wider accordingly, which leads to an increase in noise and degradation in sensitivity. As such, sensitivity and sweep rate have a trade-off relationship, meaning an improvement of both cannot be obtained at the same time.

To solve this problem, it is conceivable to provide structural elements from the reception PN code generation unit 604 to the signal processing unit 605 in plurality and set individual delay times $\tau$, whereby sweeping of $\tau$ can be eliminated and simultaneous and parallel measurement of a concerned range of distance can be executed. However, the balanced modulator 624 and the quadrature demodulator 625 are high frequency circuits which handle radio frequencies, and since millimeter waveband frequencies are used especially in near field measurement usage, which requires a high distance resolution, even if the balanced modulator 624 and quadrature demodulator 625 were integrated in a circuit, the structural elements of the circuit would have a size in the few hundred micrometers range determined by the wavelength of that frequency band, and one side of the whole circuit would have a size in the few millimeters range, so providing a multiplicity of these integrated circuits would not be realistic from a cost perspective. Moreover, even if integrated, this configuration would not be preferable because signal leakage would occur between proximate circuits in the integrated circuit causing interference between signals of different delay times intended to be independent from each other, leading to an increase in the probability of a false positive detection occurring.

PTL 2 discloses a technique in which a reception signal is input into a quadrature demodulator as-is to transform it into a frequency-spread baseband signal, and after the baseband signal is transformed into a digital signal using an AD converter, a correlation with the reception correlation code is calculated using digital signal processing.

With this technique, correlation operations with respect to a plurality of delays can be calculated using a logic circuit, and not only is it possible to markedly increase the degree of integration with a logic circuit in comparison to a high frequency circuit, but it is highly favorable since no interference occurs between signals of different delay times.

However, there is a problem with the conventional techniques disclosed in PTL 2 in that an extremely high speed and wide dynamic range AD converter is necessary. In other words, the sampling rate of the AD converter must be at least equal to the chip rate of the transmission PN code.

When the chip rate of the transmission PN code is 1/Tc, that is to say, when the time per 1 bit of code is Tc, the distance that the detection radio wave propagates during Tc, using the speed of light c, is c×Tc. As such, when calculating for a distance resolution for 10 cm, for example, the resolution of round-trip propagation distance from the object is 20 cm, and $$Tc=0.2 [m]/(3\times10^8 [m/sec])=667 [psec]$$

In other words, the sample rate of the AD converter needs to be at least 1.5 Gsps.

Moreover, even if the dynamic range at the output end of the reception antenna is determined based on a concerned range of distance as a measurement target and a size of the radar cross section of an assumed target object, and transformed into a baseband signal by the quadrature demodulator through the low noise amplifier, the dynamic range, as the ratio of the largest signal and the smallest signal, is not moderated but maintained as-is, and as such, the dynamic range of the AD converter needs to be larger than that to completely detect all of the measurement target.

For example, in the case of an automobile near field radar, since signal attenuation due to propagation over a distance of a range of one to ten meters is proportional to the fourth power of the distance, a dynamic range of approximately 40 dB, and ratio of the radar cross section of a person to that of an automobile of approximately 35 dB can be expected, resulting in a total dynamic range of approximately 75 dB. In this case, an AD converter having at least a 13 to 14 bit resolution is required. An AD converter capable of such high resolution and high speed requires an extremely large amount of power and a lot of space on an integrated circuit. As such, such an apparatus is high-cost.

According to an exemplary embodiment disclosed herein, a signal processing apparatus which calculates a correlation value between an input analog signal and a given digital code includes: a noise adder which adds a noise signal to the analog signal; a comparator which compares, synchronously with a clock signal having a first period, a magnitude of the analog signal added with the noise signal with a magnitude of a given voltage; a multiplier which receives an input of a comparison result from the comparator and the given digital code and calculates, synchronously with the clock signal, an exclusive OR between the comparison result and the given digital code; and a counter which accumulates calculation results from the multiplier over a second period in a time series, and calculates, as the correlation value, a difference between an accumulation result and one-half of a quotient of the second period and the first period.

With this, it is possible to calculate a correlation between an analog signal and a digital code which operate in a large dynamic range without the use of a high cost, high power consuming, high speed, and high resolution AD converter.

Moreover, for example, the second period may be more than two times as long as a cycle period of the digital code.

With this, it is possible to average a plurality of correlation results and suppress the influence of noise signals. As a result, a wider dynamic range can be realized.

Moreover, for example, the digital code may be an NI-sequence code, and the quotient of the second period and the first period may be greater than one-tenth of a square of a total number of codes included in one period of the digital code.

With this, it is possible to avoid a digital code having an excessively long code length which complicates the system. Moreover, since an M-sequence code has a self-correlation characteristic having a single peak at a phase difference of zero, it is possible to reduce false positive detections with the use of an M-sequence code as the digital code.

Moreover, for example, the signal processing apparatus may further include a noise generator which includes a reverse-biased P-N junction diode and generates the noise signal.

With this, a noise generator having a very simple structure is possible.

Moreover, for example, the signal processing apparatus may further include a control unit configured to control the noise generator to reduce an amplitude of the noise signal within a range wherein the correlation value does not become saturated.

With this, the dynamic range of the signal processing apparatus is optimized according to the signal strength of the input analog signal, and the sensitivity is maximized when the signal strength of the analog signal is weak.

Moreover, for example, a frequency component of the noise signal may include a frequency band greater than or equal to a frequency that is half a frequency of the clock signal.

With this, the samples accumulated in the second period by the counter are mutually independent.

Moreover, a radar apparatus according to an exemplary embodiment disclosed herein includes the signal processing apparatus. More specifically, the radar apparatus according to an exemplary embodiment disclosed herein includes: a plurality of the signal processing apparatuses; a transmission unit including: a pseudo noise code generator which generates a pseudo noise code synchronously with the clock signal; an oscillator which generates a carrier wave; a modulator which generates a modulation signal by modulating the carrier wave with the pseudo noise code; and a transmission antenna which radiates the modulation signal; a reception unit including: a reception antenna which receives a reflected wave that is the modulation signal radiated by the transmission unit and reflected back from an object which reflects radio waves, and outputs a reception signal; and a down-converter which generates a baseband signal by detecting the reception signal using the carrier wave; and a delayed code generator which generates a plurality of delayed codes by delaying the pseudo noise code by a plurality of mutually different delay times, wherein the plurality of signal processing apparatuses correspond to the plurality of delayed codes on a one-to-one basis, mutually receive an input of the baseband signal as the analog signal, each receive an input of a corresponding one of the plurality of delayed codes as the digital code, and output, using a plurality of the correlation values calculated by the counter, a plurality of reflection signals which are digital signals indicating the reflected waves from ranges of distance corresponding to the plurality of delayed codes, and the radar apparatus calculates at least one of a speed, direction, or position of the object using the plurality of reflection signals output by the plurality of signal processing apparatuses.

It should be noted that these general and specific aspects may be implemented as a method.

Hereinafter, certain exemplary embodiments are described in greater detail with reference to the accompanying Drawings.

Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Figure 1:
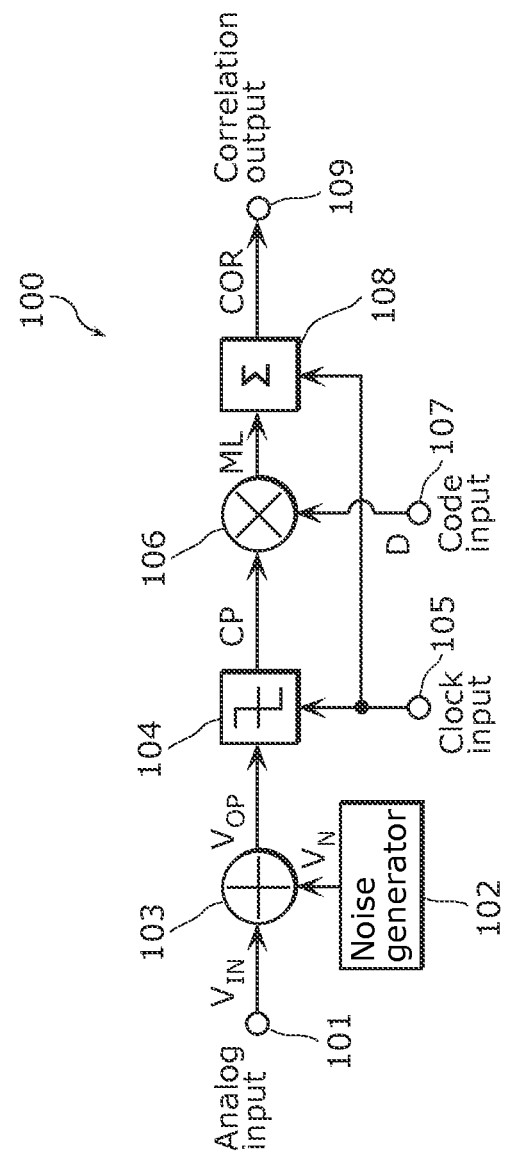
FIG. 1 is a block diagram showing the configuration of the signal processing apparatus according to Embodiment 1.

FIG. 1 is a block diagram showing the configuration of the signal processing apparatus 100 according to Embodiment 1.

The signal processing apparatus 100 is a signal processing apparatus which obtains a correlation between an analog signal and a digital code, and includes an analog signal input terminal 101, a noise generator 102, an adder 103, an analog comparator 104, a dock input terminal 105, a multiplier 106, a code input terminal 107, a counter 108, and a correlation output terminal 109. It should be noted that the signal processing apparatus 100 is also referred to as a digital correlator.

The noise generator 102 generates a noise signal, and for example, generates a noise signal whose voltage has a Gaussian distribution of an average voltage $\mu_N$ and a standard deviation $\sigma_N$. It should be noted that the noise signal is not limited to this example, and the cumulative distribution function of the probability distribution of the noise signal may have a portion equivalent of a straight line.

The adder 103 adds the voltage of the analog signal input from the analog signal input terminal 101 (hereinafter referred to as $V_{IN}$) and the noise signal generated by the noise generator 102, and inputs the added result into the analog comparator 104.

The analog comparator 104 compares, synchronously with a period Tc defined by the clock signal input to the clock input terminal 105, a fixed voltage set internally (hereinafter also referred to as a reference voltage) and an output voltage of the adder 103 (hereinafter referred to as $V_{CP}$), and in accordance with the magnitude relation, outputs a logical value of either 1 or 0 as a 1 bit sample to the multiplier 106 (this logic is hereinafter referred to as CP).

The reference voltage set internally in the analog comparator 104 is a central voltage of the amplitude of the analog signal, and is, for example 0 V. Moreover, for example, when the analog signal has a bias voltage Vbias, the reference voltage is Vbias. Moreover, the reference voltage and a voltage which halves the cumulative probability of the noise signal may be equal.

The multiplier 106 outputs, to the counter 108, an XOR between (i) a given digital code which is input from the code input terminal 107 and which takes on a logical value of 1 or 0 and (ii) an output of the analog comparator 104. In other words, when the logic of the code input terminal 107 (hereinafter referred to as D) is 1, the output logic CP of the analog comparator is inverted and output, and when D is 0, the CP is output as-is. More specifically, when the output logic of the multiplier 106 is ML, (i) ML=0 when D=1 and CP=1, (ii) ML=1 when D=1 and CP=0, (iii) ML=0 when D=0 and CP=0, and (iv) ML=1 when D=0 and CP=1.

The counter 108 accumulates output logic ML from the multiplier 106 across an averaging sample size N. More specifically, the counter 108 outputs to the correlation output terminal 109, synchronously with a period Tc defined by the clock signal input to the clock input terminal 105, a counting result of output logic=1 occurrences from the multiplier 106 across a sample having an averaging sample size N, which is set internally, as a digital signal having a bit width that allows for an output maximum value N to be expressed (hereinafter this value is referred to as COR).

Next, an operation of the signal processing apparatus 100 according to an embodiment having a structure similar to this will be described.

Figure 2:
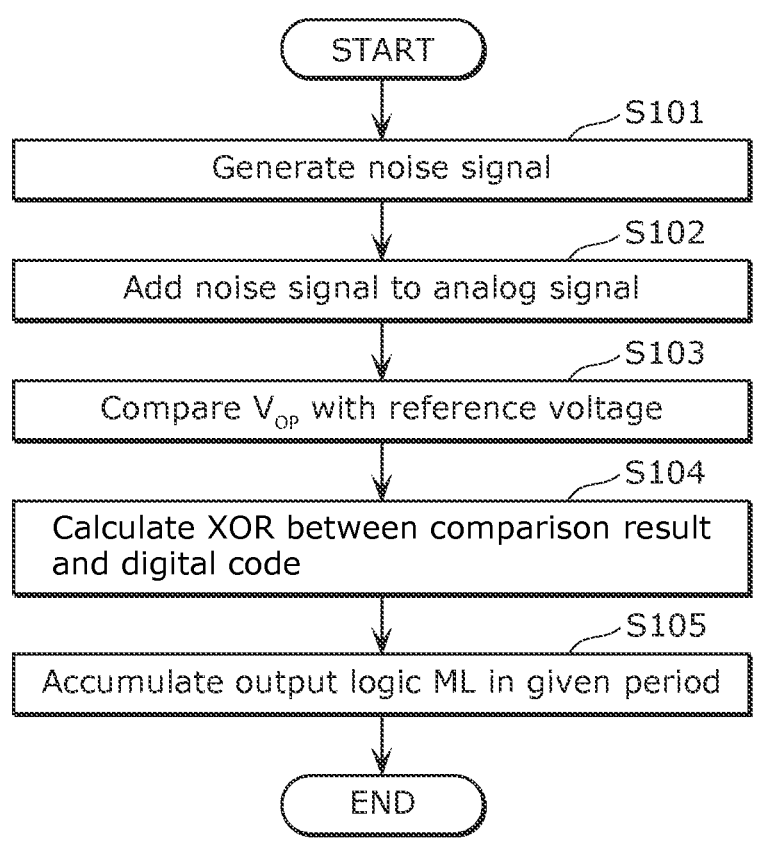
FIG. 2 is a flow chart showing an operation of the signal processing apparatus.

FIG. 2 is a flow chart showing an operation of the signal processing apparatus 100.

First, the noise generator 102 generates a noise signal (S101).

Next, the adder 103 adds the noise signal generated in step S101 to an analog signal input via the analog signal input terminal 101 (S102). The adder 103 then outputs the analog signal added with the noise signal.

The analog comparator 104 compares the voltage $V_{OP}$ of the analog signal added with the noise signal output from the adder 103 with the reference voltage (S103). The analog comparator 104 then outputs an output logic CP of either 0 or 1 indicating the comparison result. For example, the analog comparator 104 outputs a CP of 1 when the $V_{OP}$ is higher than the reference voltage, and outputs a CP of 0 when the $V_{OP}$ is lower than the reference voltage. Here, the comparison of the $V_{OP}$ and a given voltage by the analog comparator 104 is performed in synchronization with a clock signal input via the clock input terminal 105. In other words, the analog comparator 104 outputs the output logic CP in synchronization with a period Tc.

Next, the multiplier 106 calculates an XOR between the CP indicating the comparison result from the analog comparator 104 and the digital code D input via the code input terminal 107 (S104). The multiplier 106 then outputs an output logic ML of either 0 or 1 indicating the XOR calculation result. In other words, the multiplier 106 outputs 0 as ML when the logic CP and D match, and outputs 1 as ML when the logic CP and D do not match.

Lastly, the counter 108 accumulates the output logic ML from the multiplier 106 in a given period (S105). In other words, the counter 108 accumulates ML across an averaging sample size N, and outputs COR which is a digital value indicating the accumulation result, in other words, the COR is a correlation value between the analog signal voltage and the digital code D for an averaging sample size N.

In this way, the signal processing apparatus 100 is capable of calculating a correlation value between the voltage $V_{IN}$ of the analog signal and the digital code D.

As a result, when there is no correlation between the waveform of $V_{IN}$ and the waveform of D in time series, the output COR from the correlation output terminal 109 gradually approaches N/2 as the sample size N increases, and when there is correlation, COR gradually approaches a value in accordance with the amplitude of the component correlative with the D in $V_{IN}$. This operation will be described using FIG. 3A, FIG. 3B, FIG. 4A, and FIG. 4B.

Figure 3A:
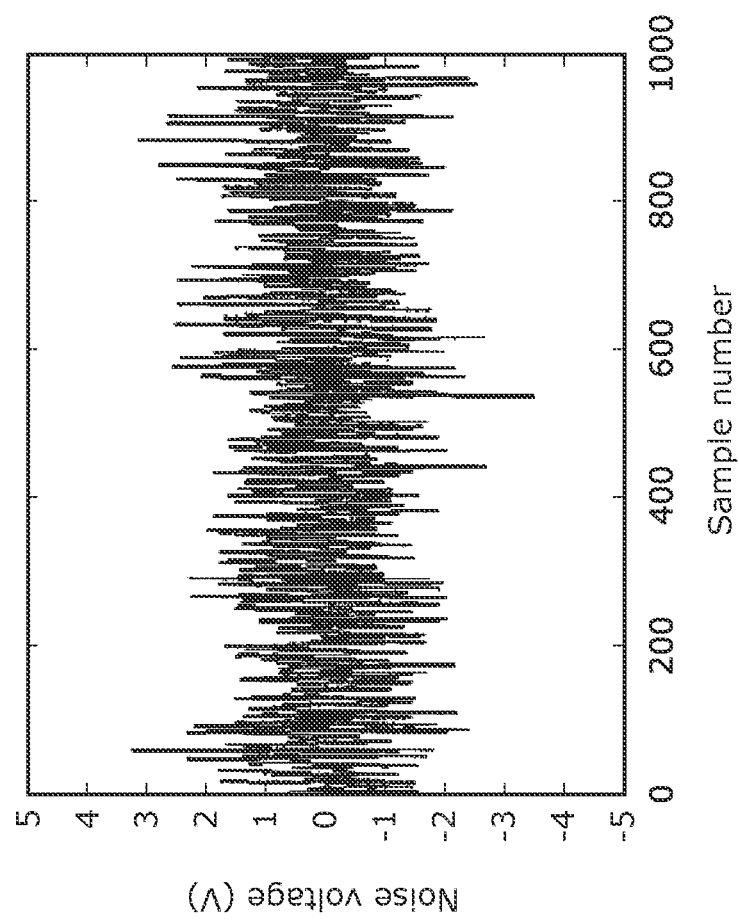
FIG. 3A is a graph showing an example of the voltage waveform of the noise signal.
Figure 3B:
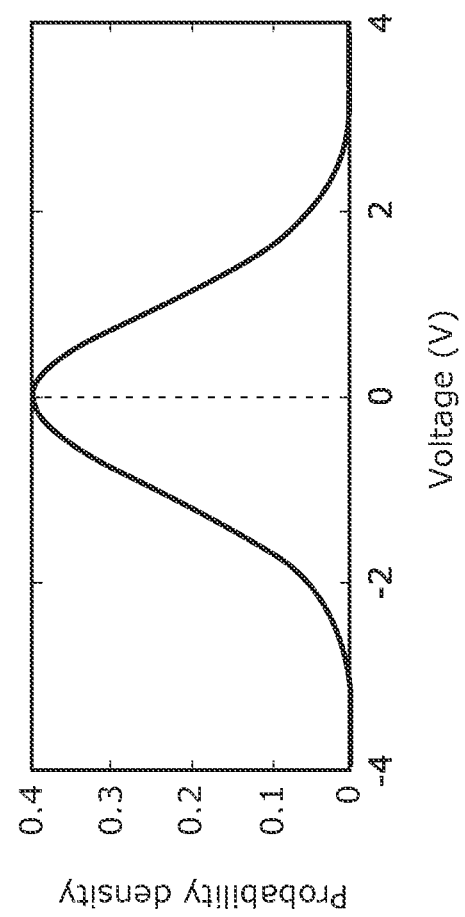
FIG. 3B is a graph showing a probability distribution of the voltage of the noise signal.

FIG. 3A is a graph showing an example of the voltage waveform of the noise signal generated by the noise generator 102 (hereinafter referred to as $V_N$). FIG. 3A shows a result when Gaussian noise of average voltage $\mu_N=0$ V and standard deviation $\sigma_N=1$ V, and the voltage probability density is the normal distribution shown in FIG. 3B.

(When Analog Signal Voltage is Constant)

Figure 4A:
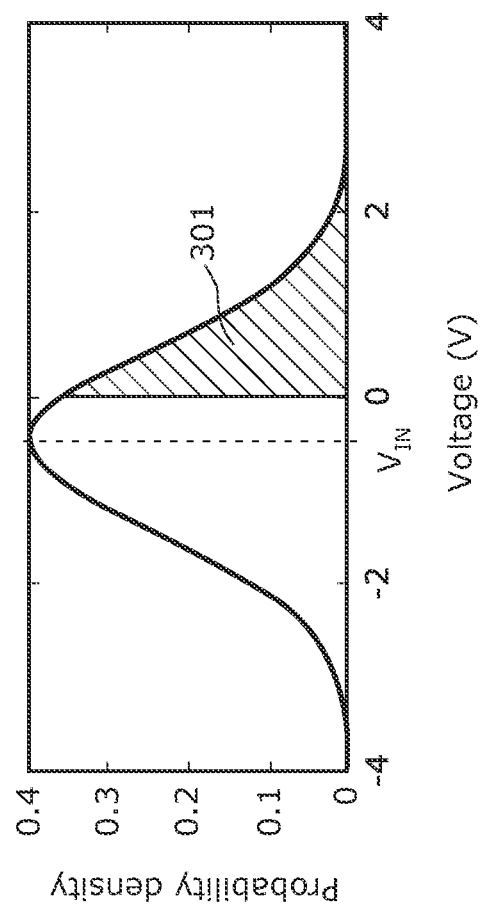
FIG. 4A is a graph showing a probability distribution of the input voltage of the analog comparator.

FIG. 4A is a graph showing the probability distribution of the input voltage of the analog comparator 104 when a constant negative voltage $V_{IN}$ is applied to the analog signal input terminal 101. Due to the adder 103, the average voltage of the noise voltage shifts toward $V_{IN}$.

Figure 4B:
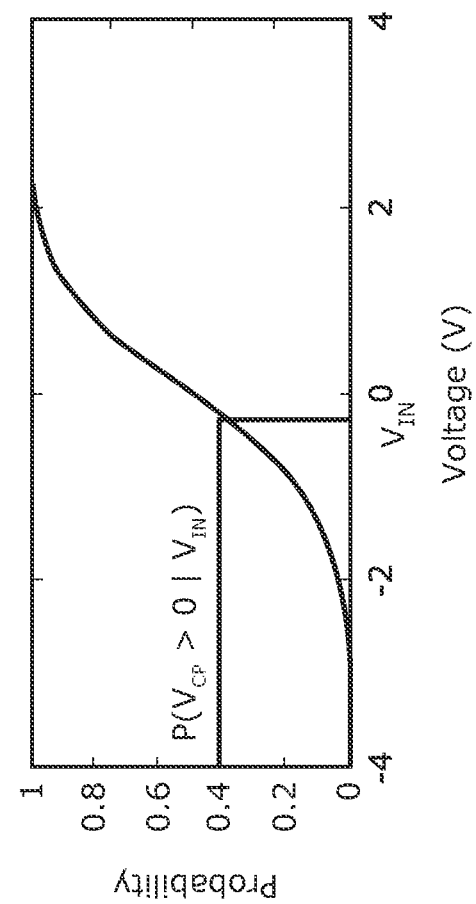
FIG. 4B is a graph showing a cumulative distribution of the input voltage of the analog comparator.

When the reference voltage of the analog comparator 104 is 0 V, the probability that the output logic of the analog comparator 104 will be 1 is a value obtained by integrating the portion 301 indicated by the diagonal lines in FIG. 4A with respect to the voltage, and when compared with $V_{IN}$, the result is like what FIG. 4B shows.

Thus, as the sample size N increases, the number of occurrences of 1 in the output logic from the analog comparator 104 (hereinafter referred to as $N_{CP=1}$) gradually approaches a product of the probability shown in FIG. 4B with respect to $V_{IN}$ (hereinafter referred to as $P_{CP=1}$) and the sample size N ($N \times P_{CP=1}$), meaning it is possible to estimate $V_{IN}$ from $N_{CP=1}$. In particular, as Equation 1 shows, it is possible to approximate the relationship between $V_{IN}$ and $P_{CP=1}$ to the extent that linear approximation of the relationship is possible, using the constants A and B.

$$P_{CP=1} = A \times V_{IN} + B \quad \text{(Equation 1)}$$

With this, the voltage $V_{IN}$ of the analog signal can be estimated using: $V_{IN} = (N_{CP=1}/N - B)/A$.

The constants A and B are determined from the distribution of $V_N$, and in this case, $A = e/\sqrt{(2\pi\sigma_N)} \approx 0.399$ and $B=0.5$, where e is the base of the natural logarithm.

In this way, when the voltage $V_{IN}$ of the analog signal is a constant voltage, it is possible to estimate the voltage $V_{IN}$ of the analog signal from the output CP of the analog comparator 104. In other words, it is possible to estimate the input level, which is the voltage $V_{IN}$ of the analog signal.

(When Analog Signal Voltage is not Constant)

When the voltage $V_{IN}$ of the analog signal is not a constant voltage, the method described above of estimating $V_{IN}$ from $N_{CP=1}$, the number of occurrences of output logic=1 from the analog comparator 104, can be applied by taking into consideration the probability that CP will equal 1 with respect to a given $V_{IN}$.

When $V_{IN}$ is not a constant voltage, the probability that CP will equal 1, $P_{CP=1}$, is calculated as the product of the probability density that $V_{IN}$ will occur, $f(V_{IN})$, and the probability that CP will equal 1 when $V_{IN}$ occurs, $P(CP=1|V_{IN})$. Since $V_N$ is the voltage of a noise signal and independent from the voltage $V_{IN}$ of the input signal, $P(CP=1|V_{IN})$ is the same as when $V_{IN}$ is a constant voltage, and as such, Equation 1 holds. Thus, when the majority of the range of variation in $V_{IN}$ (for example, a range of a standard deviation of the mean of the $V_{IN}$ in a positive or negative direction) is included in a range for linearly approximating the relationship between $V_{IN}$ and $P_{CP=1}$ (for example, within 10% of a linear relationship) and $V_{IN}$ is not constant, using Equation 1, the probability that CP will equal 1, $P_{CP=1}$, can be expressed as: $P_{CP=1} = (A \times V_{IN} + B) \times f(V_{IN})$.

At this time, using the expected value of $V_{IN}$, $E[V_{IN}]$, the expected value of the output logic CP from the analog comparator, $E[CP]$, is expressed as $E[CP] = A \times E[V_{IN}] + B$. From this the average value of $V_{IN}$ can be estimated. Here, "E[ ]" denotes an expected value. In other words, the value of CP is discretized into two values, 1 and 0, but the average thereof corresponds linearly to $V_{IN}$.

Next, the output logic from the analog comparator 104 is inverted by the multiplier 106 in accordance with the logic from the code input terminal 107, and output as ML.

Furthermore, the counter 108 counts the number of occurrences of ML=logic 1 across the sample size N, and outputs the count as COR. In other words, the counter 108 counts the number of logic 1 occurrences in a period corresponding to the sample size N, This output gradually approaches the following value as N increases. In other words, the output COR from the counter 108 gradually approaches the product of the expected value of ML, E[ML], and the sample size N.

$$COR = N \times E[ML] = N \times E[(CP-0.5) \times (D-0.5) \times 2 + 0.5]$$

The correlation strength between the voltage $V_{IN}$ of the analog signal and the digital code D, $E[(V_{IN}-\mu_{VIN}) \times (D-\mu_D)]$, can be calculated from COR. This will be explained with the following equation transformations. Here, $E[X|A]$ expresses the expected value of X when A occurs, and $\mu X$ expresses the mean of X. This also applies hereinafter.

$$\begin{aligned}
COR/N &= E[2 \times CP \times D - (CP+D) + 1] \quad \text{(Equation 2)}\\
&= 2 \times P(CP=1|D=1) \times P(D=1) - \\
&\quad (\mu_{CP} + \mu_D) + 1\\
&= 2 \times (A \times E[V_{IN}|D=1] + B) \times P(D=1) - \\
&\quad (\mu_{CP} + \mu_D) + 1\\
&= 2 \times A \times E[V_{IN}|D=1] \times P(D=1) + \\
&\quad 2 \times B \times \mu_D - (\mu_{CP} + \mu_D) + 1
\end{aligned}$$

In other words, $$\begin{aligned}
(COR/N &- 2 \times B \times \mu_D + (\mu_{CP} + \mu_D) - 1)/(2 \times A)\\
&= E[V_{IN}|D=1] \times P(D=1)\\
&= E[V_{IN} \times D]\\
&= E[(V_{IN} - \mu_{VIN}) \times (D - \mu_D) + \\
&\quad (\mu_D V_{IN} + \mu_{VIN} D - \mu_{VIN} \mu_D)]\\
&= E[(V_{IN} - \mu_{VIN}) \times (D - \mu_D)] + \mu_D \mu_{VIN}
\end{aligned}$$

$$\begin{aligned}
E[(V_{IN} - \mu_{VIN}) &\times (D - \mu_D)] = \\
&= (COR/N - 2 \times B \times \mu_D + (\mu_{CP} + \mu_D) - 1)/(2 \times A) - \\
&\quad \mu_D \mu_{VIN}\\
&\approx (COR/N - 0.5)/0.798
\end{aligned}$$

Here, since $V_N$ is a noise independent from digital code D, $P(CP=1|D=1) = A \times E[V_{IN}|D=1] + B$ formed from Equation 1 is used.

In this way, when the voltage $V_{IN}$ of the analog signal is not a constant voltage, it is possible to estimate the voltage $V_{IN}$ of the analog signal from the output COR of the counter 108. In other words, it is possible to estimate the input level from the output level of the signal processing apparatus 100.

That is, since the multiplier 106 calculates the XOR between the mutually independent output logic CP of the analog comparator and the digital code D, the probability that 0 will be output as ML and the probability that 1 will be output as ML are equal when there is no correlation between the voltage $V_{IN}$ of the analog signal and the digital code D. In contrast, when there is correlation between the voltage $V_{IN}$ of the analog signal and the digital code D, the probability that 0 will be output as ML and the probability that 1 will be output as ML are different and, furthermore, the greater the amplitude of the voltage $V_{IN}$ of the analog signal is, the greater the difference in the probability that 0 will be output as ML and the probability that 1 will be output as ML becomes.

Thus, when the sample size N is a sufficiently large value, the output COR of the counter 108 is a value that is one-half of the sample size N when there is no correlation and a value different than one-half of the sample size N when there is correlation. Moreover, when there is correlation, COR is a value in accordance with the amplitude of a component correlative with D included in the voltage $V_{IN}$ of the analog signal. In other words, when there is correlation, COR is a value corresponding to the level of the voltage $V_{IN}$ of the analog signal.

That is, when there is no correlation between the waveform of $V_{IN}$ and the waveform of D in time series, the output COR from the correlation output terminal 109 gradually approaches N/2 as the sample size N increases, and when there is correlation, COR gradually approaches a value in accordance with the amplitude of the component correlative with the D in $V_{IN}$. In other words, when there is correlation between a signal component included in the analog signal and the digital code, COR gradually approaches a value in accordance with the signal strength of a signal component correlative with the analog signal. When there is this correlation, based on N/2, the greater the signal strength of the correlative signal component, the closer COR comes to a value approximate to 0 or a value approximate to N. In other words, when there is no correlation between the analog signal and the digital code, the difference between COR and N/2 becomes substantially 0, and when there is correlation between the analog signal and the digital code, the difference between COR and N/2 increases with the signal strength of a signal component correlative to the digital code in the analog signal.

Next, the input and output characteristics of the signal processing apparatus 100 when there is correlation and when there is no correlation between the waveform of $V_{IN}$ and the waveform of D in time series will be discussed.

Figure 5:
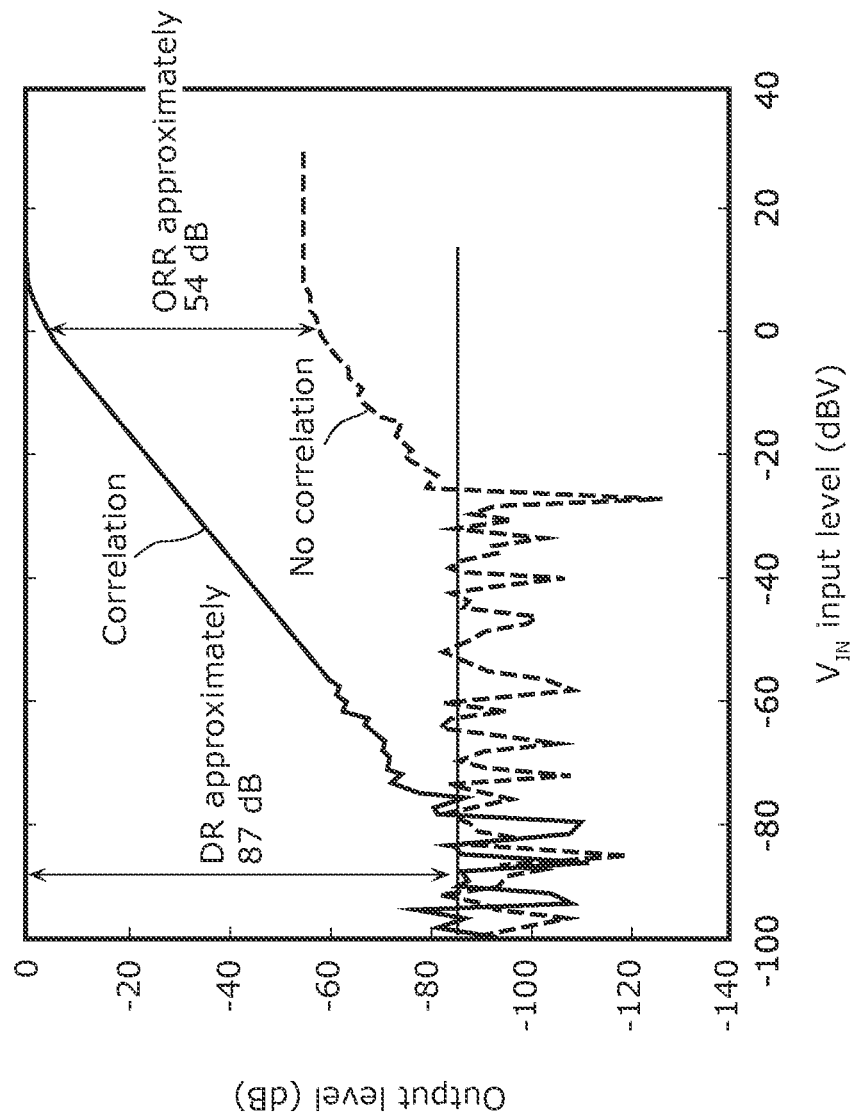
FIG. 5 is a graph showing an input-output characteristic of the signal processing apparatus.

FIG. 5 is a graph showing the output level of the signal processing apparatus 100 with respect to the input level of the signal processing apparatus 100. More specifically, FIG. 5 shows OUT=(COR/N−0.5) with respect to $V_{IN}$. It should be noted that the voltage level of $V_{IN}$ is represented on the horizontal axis and an output level based on the saturate level of OUT when there is correlation is represented on the vertical axis. The voltage level of $V_{IN}$ is, when the voltage of the analog signal is not a constant voltage, equivalent to the amplitude of the analog signal. The output level is a value OUT.

Moreover, FIG. 5 shows input and output characteristics when the noise signal $V_N$ is a Gaussian noise having an average voltage $\mu_N$ of 0 V and a standard deviation $\sigma_N$ of 1 V, the digital code D is a M-sequence code having a 511-bit period, and the counter 108 counts $10^6$ periods worth of digital code D (sample size N=5.11×$10^8$), D is attenuated to $V_{IN}$, and shows OUT when input as-is (solid line) and OUT when delayed (dashed line) with respect to the input level. In other words, FIG. 5 is a graph showing the output level of the signal processing apparatus 100 with respect to the input level of the signal processing apparatus 100, wherein the graph shown by the solid line is a graph which corresponds to the correlation value when there is correlation, and the graph shown by the dashed line is a graph which corresponds to the correlation value when there is no correlation.

As FIG. 5 shows, when there is correlation, as the input level increases, the output level also increases in a linear fashion. In contrast, when there is no correlation, the output level does not increase even when the input level increases. In other words, when there is correlation, the input level of $V_{IN}$ can be estimated from OUT. That is, the amplitude of $V_{IN}$ can be estimated from COR.

Moreover, in either case, when the input level is greater than or equal to −80 dBV, the output level is below the noise floor, but this noise floor is a result of the noise signal generated by the noise generator 102. Moreover, even when there is no correlation, from around when the input level exceeds −20 dBV, the output level does increase with the input level, but details regarding this will be discussed later.

Here, since the dynamic range DR is defined as the amplitude ratio of the maximum OUT value and the noise floor, it can be seen from FIG. 5 that the dynamic range DR is approximately 85 dB.

Moreover, the dynamic range DR is theoretically expressed by Equation 3 using the sample size N.

$$DR = \sqrt{N} \tag{Equation 3}$$

Thus, from this theoretical equation, the dynamic range of the counting result by the counter 108 for $10^6$ periods of the digital code D (sample size N=5.11×$10^8$) is 87 dB. In other words, the signal processing apparatus 100 according to Embodiment 1 can achieve a dynamic range substantially equal to the theoretical value.

That is to say, the signal processing apparatus 100 according to Embodiment 1 is capable of obtaining a correlation between an input signal and a digital code D in large dynamic range without the use of a high speed and high resolution AD converter. For example, when the signal processing apparatus 100 according to Embodiment 1 is applied in the previously mentioned automobile near field radar, the radar can exceed the dynamic range called for of 75 dB. Thus, even if signal attenuation from propagation influences the reflected waves from the measurement target and there is influence from the ratio of the radar cross section of a person to that of an automobile, it is possible to detect the measurement target.

The signal processing apparatus 100 according to Embodiment 1 is a signal processing apparatus which calculates a correlation value between an input analog signal and a digital code D, and includes: the adder 103 which adds a noise signal to the analog signal; the analog comparator 104 which compares, synchronously with a clock signal having a period Tc, a magnitude of the analog signal added with the noise signal with a reference voltage; the multiplier 106 which receives an input of a comparison result from the analog comparator 104 and the given digital code D and calculates, synchronously with the clock signal, an XOR between the comparison result of the analog comparator 104 and the digital code D; and the counter 108 which accumulates calculation results from the multiplier 106 over a given period in a time series, and calculates, as the correlation value, a difference between an accumulation result and one-half of a quotient of the given period and the period Tc.

It should be noted that the analog comparator 104 and the counter 108 are examples of a comparator and a counter, respectively.

With this, it is possible to calculate a correlation between an analog signal and a digital code which operate in a large dynamic range as a result of digital signal processing, without the use of a high cost, high power consuming, high speed, and high resolution AD converter.

Moreover, when there is correlation between an analog signal and a digital code, the correlation value is a value in accordance with the input level of the analog signal. In other words, the input level of the analog signal can be calculated from the correlation value.

Next, in the case where there is no correlation shown in FIG. 5, the reason for the output level increasing with the input level from around when the input level exceeds −20 dBV will be discussed.

When a high level signal is input in the signal processing apparatus 100 as the analog input signal, even when there is no correlation between the analog input signal and the digital code D, a given output level is output in accordance with the self-correlation characteristic of the digital code D.

More specifically, the self-correlation characteristic of the M-sequence code having a 511-bit period, other than at the peak of the phase difference of 0, becomes $-1/N_D$ where $N_D$ is the number of bits making up one period of code (herein after $N_D$ is also referred to as out-of-range rejection ratio (ORR)). In other words, the out-of-range rejection ratio becomes 20 log (511) [dB], and in this case, the theoretical value is 54 dB. In other words, in a radar apparatus using the signal processing apparatus 100 which measures reflected waves for each range of distance corresponding to a delay time (range) by measuring the reflected waves from objects with the digital code delayed bit by bit, the reflected waves of a value obtained by dividing, by ORR, the level of the large reflected waves from the ranges outside of the measurement target appear to be in the measurement target ranges even when there are no reflected waves from the measurement target ranges, when there are large reflected waves from ranges outside of the measurement target.

The amplitude ratio of the solid line and dashed line in FIG. 5 can be interpreted as this out-of-range rejection ratio and, from around when the input level exceeds −20 dBV, is substantially the same as the theoretical value 54 dB.

In this way, even when there is no correlation, when the value obtained by dividing, by ORR, the largest output levels when there is correlation is greater than the noise floor, the output level when there is no correlation becomes greater than the noise floor. In other words, even when there is no correlation, the output level increases with the input level.

Also, as previously described, by making the sample size sufficiently large, it is possible to achieve a wide dynamic range. Here, the sample size N counted by the counter 108 is required to be one or more periods worth of digital code D in order to complete the correlation calculation, but is preferably two or more periods worth. In other words, the period in which the counter 108 collects the counting result of the multiplier 106 is more than two times longer than the cycle period of the digital code. It should be noted that the period in which the counter 108 collects the counting result of the multiplier 106 is equivalent to the second period.

With this, it is possible to average a plurality of correlation results and suppress the influence of noise, and thus achieve a wide dynamic range. However, this wide dynamic range is achieved by increasing N, which means that the output sample rate of the correlation output COR becomes slower than the bit rate of digital code D by a value obtained by raising the dynamic range to the second power.

On the other hand, when the signal processing apparatus 100 used for measuring distances such as when used in a radar, while it has already been discussed that a code rate of 1.5 Gbps is required to gain a distance resolution of 10 cm, the refresh period of the distance measurement result is often sufficient even at a few Hz, and since in this case it is 3 Hz, use in detecting obstacles when backing up in an automobile is permissible. Moreover, the dynamic range obtained with these factors is 87 dB, and as such, is sufficient enough for the dynamic range required in high resolution radars for detecting people or automobiles.

Moreover, when the detection target is a moving object such as a pedestrian, N may be reduced in size. In this case, a frequency discriminator such as a fast Fourier transformer may be provided at a later stage of the circuitry, and the signals may be further discriminated for each Doppler frequency corresponding with the movement. With this configuration, even though the COR frequency band becomes a high bandwidth and the noise floor increases as a result of the reduction in size of N, the signals obtained after separation per Doppler frequency component have a limited frequency band, and not only is it possible to maintain the dynamic range since the noise floor is reduced, but it is also possible to estimate the traveling speed of the object.

Here, the signal processing apparatus 100 according to Embodiment 1 uses, as a quantizer for transforming the analog signal into a digital signal, the analog comparator 104, which outputs a binary logical value depending on the magnitude of a fixed voltage and an input voltage. Compared to a high resolution AD converter operating the same sampling rate, the analog comparator 104 is vastly simpler in design, requires less space in an integrated circuit, and consumes less power. Thus, with this embodiment, it is possible to achieve a high-efficiency digital correlator configured of only the low-cost analog comparator 104 and a logic circuit.

The method of adding the noise signal to the analog signal in Embodiment 1 is fundamentally different from dithering, a distortion reducing technique used in an AD converter, With dithering, noise is added to the input of the AD converter and then quantized. Influence from distortion is driven out of a desired frequency band by uniquely extracting the desired frequency band using a digital filter.

To calculate the correlation between the analog signal and the digital code, all frequency bands of a signal digitally transformed with a sample rate at least equal to the code rate are required. As such, the transformation result using a dithering technique in which the frequency band after digital transformation is limited cannot be applied. Embodiment 1 is a new idea derived from a new problem different from the problem on which the dithering technique is based that an extremely larger dynamic range is required to meet the conditions unique to radar use that that the refresh rate of the correlation output is usable even if very slow relative to the sample rate of the analog signal.

Here, for distance measurement purposes such as in radars, use of an M-sequence code as the digital code D is preferable. As previously described, an M-sequence code has a self-correlation characteristic having a single peak at a phase difference of zero, and, with code length $N_D$, becomes $-1/N_D$ at other phase differences having a time difference of 1 bit or longer, meaning there is a superior feature in that there is no sub peak, which is a cause of target false positive detection.

At this time, when the dynamic range DR of the correlation output is exceptionally smaller than the out-of-range rejection ratio $N_D$, when the input signal greatest in magnitude within the dynamic range is not correlative with the digital code, it is severely suppressed to a signal level even smaller than the smallest detection level determined by the dynamic range DR. In this case, code length is unnecessarily long, and complicating the system provides no advantageous results. As such, it is preferable that the dynamic range is greater than a value 10 dB lower than the out-of-range rejection ratio. In other words, it is preferable that a quotient of the accumulation period of the counter 108 and the period Tc of the clock signal is greater than one-tenth of the square of the number of codes included in one period of the digital code (for example, 511).

In this case, the level of the leakage signal output when the largest signal in the dynamic range is not correlative with the digital code becomes a value 10 dB lower than the smallest detection level determined by the dynamic range DR or higher, that is to say, a value 10 dB lower than the noise level or higher. As such, the leakage signal is sufficiently suppressed or the leakage signal can be observed, in contrast to the noise signal which is usually observed as having approximately 10 dB variations. With this, it is possible to avoid a digital code having an excessively long code length which complicates the system.

With this configuration, with respect to the dynamic range of the system which is determined by the self-correlation characteristic of the digital code from out-of-range leakage of large signals, it is possible to keep to a minimum the smaller ones of the signals from being undetectable by the noise floor as a result of fluctuations in the output of the noise adding calculations. Moreover, when the output sample rate of the correlation output COR is determined, it is possible to realize a well balanced system which is not overcomplicated as a result of the out-of-range rejection ratio being set, with respect to the noise floor that is determined according to the output sample rate, unnecessarily high.

Moreover, it is necessary that the voltage $V_N$ of the noise signal generated by the noise generator 102 be independent from at least the voltage $V_{IN}$ of the analog signal as well as the digital code D, and similar to Gaussian noise, it is preferable that the probability distribution thereof (an integrated function regarding the voltage of the probability density) includes a portion capable of straight line approximation. It is possible to use a P-N junction semiconductor element (in other words a diode such as a P-N junction diode) as the noise generator 102, and use shot noise generated upon application of a reverse bias.

When this kind of configuration is used, it is possible to very simply generate noise that is very accommodating to this application.

Moreover, it is preferable that the frequency component included in the noise is a frequency band at least one-half the sampling frequency in the analog comparator 104. In other words, it is preferable that the frequency component of the noise signal includes a frequency band greater than or equal to a frequency that is one-half the clock frequency 1/Tc. With this, it is possible to gain a noise that is independent from the input $V_{IN}$ as well as the digital code D for each sample. In this regard, a noise generator which uses a shot noise generated upon application of a reverse bias to the P-N junction semiconductor element is capable of generating noise having a substantially large bandwidth.

Furthermore, with the signal processing apparatus 100 according to Embodiment 1, the larger of the signals in the input dynamic range are determined by the amplitude of the noise signal $V_N$. To take advantage of this characteristic, a noise voltage adjustment unit may be provided for the noise generator 102, to adjust the input signal level of the signal processing apparatus to be within the dynamic range. Furthermore, when a level control unit which controls the noise voltage adjustment unit is provided, the level control unit is capable of changing the noise voltage level, and the correlation output COR does not change linearly with respect to changing amount within a predetermined permissible margin of error range, when it is determined that the correlation output COR has become saturated and the noise voltage is increased until COR becomes linear with the noise voltage level within the permissible margin of error, or when COR does not become saturated, the noise voltage may be controlled to reduce to a limit point at which saturation occurs.

With this kind of control, the dynamic range of the signal processing apparatus is optimized with respect to the input signal level, and sensitivity of small signals is maximized within a range wherein the large signals do not become saturated.

Figure 6:
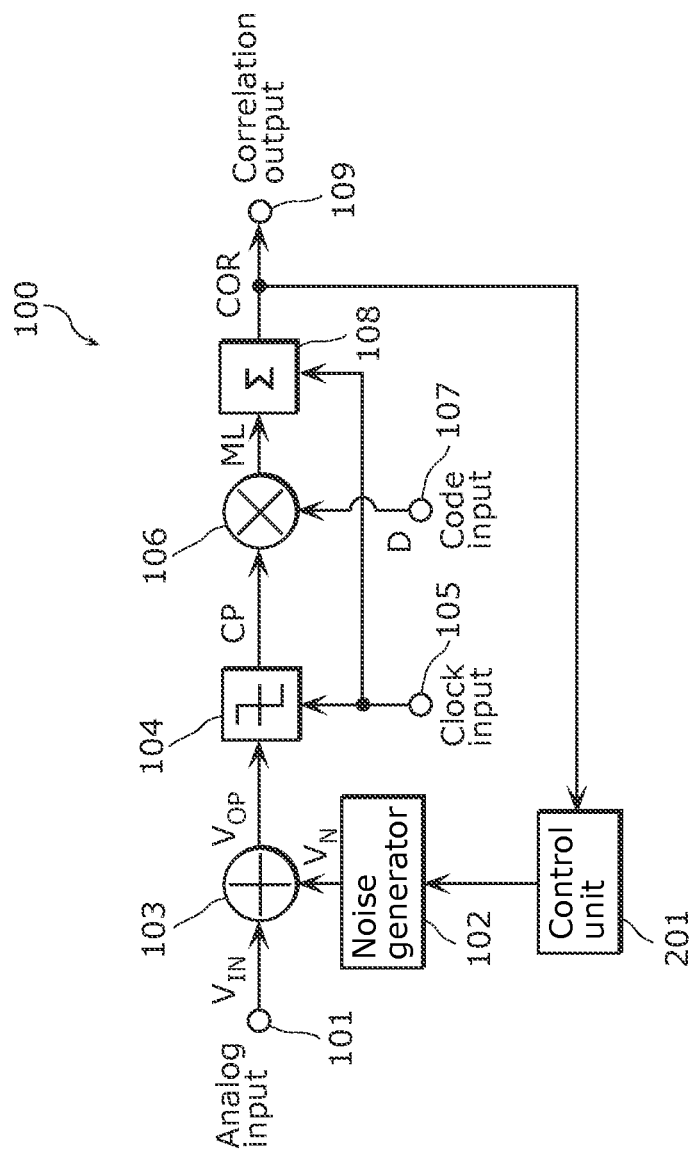
FIG. 6 is a block diagram showing the configuration of the signal processing apparatus provided with a control unit.

In other words, as FIG. 6 shows, the signal processing apparatus 100 may be provided with a control unit 201 which so controls the noise generator 102 as to reduce the amplification of the noise signal within a range wherein the correlation value does not become saturated. It should be noted that the control unit 201 is equivalent to the above described noise voltage adjustment unit and the level control unit.

In other words, as can be derived from FIG. 4A, when the probability distribution of the analog signal added with the noise signal is larger than the reference voltage, the output of the analog comparator 104 is consistently 1. As such, COR becomes N. Even if the voltage $V_{IN}$ of the analog signal is increased in this state, the output of the analog comparator 104 is consistently 1, and COR will be in a saturated state at N. Similarly, when the probability distribution of the analog signal added with the noise signal is smaller than the reference voltage, the output of the analog comparator 104 is consistently 0. As such, COR becomes 0. Even if the voltage $V_{IN}$ of the analog signal is reduced in this state, the output of the analog comparator 104 is consistently 0, and COR will be in a saturated state at 0.

Consequently, when the output level is in a saturated state, the amplitude of the noise signal is increased. This makes it possible to increase the dynamic range when the analog signal is a large signal since the reference voltage falls within the voltage range of the probability distribution of the analog signal added with the noise signal.

In contrast, when the COR is not in a saturated state, the voltage range of the probability distribution of the noise signal is narrowed by decreasing the amplitude of the noise signal. This makes it possible to increase the dynamic range when the analog signal is a small signal, in other words, it is possible to maximize sensitivity with respect to small signals.

Embodiment 2

Figure 7:
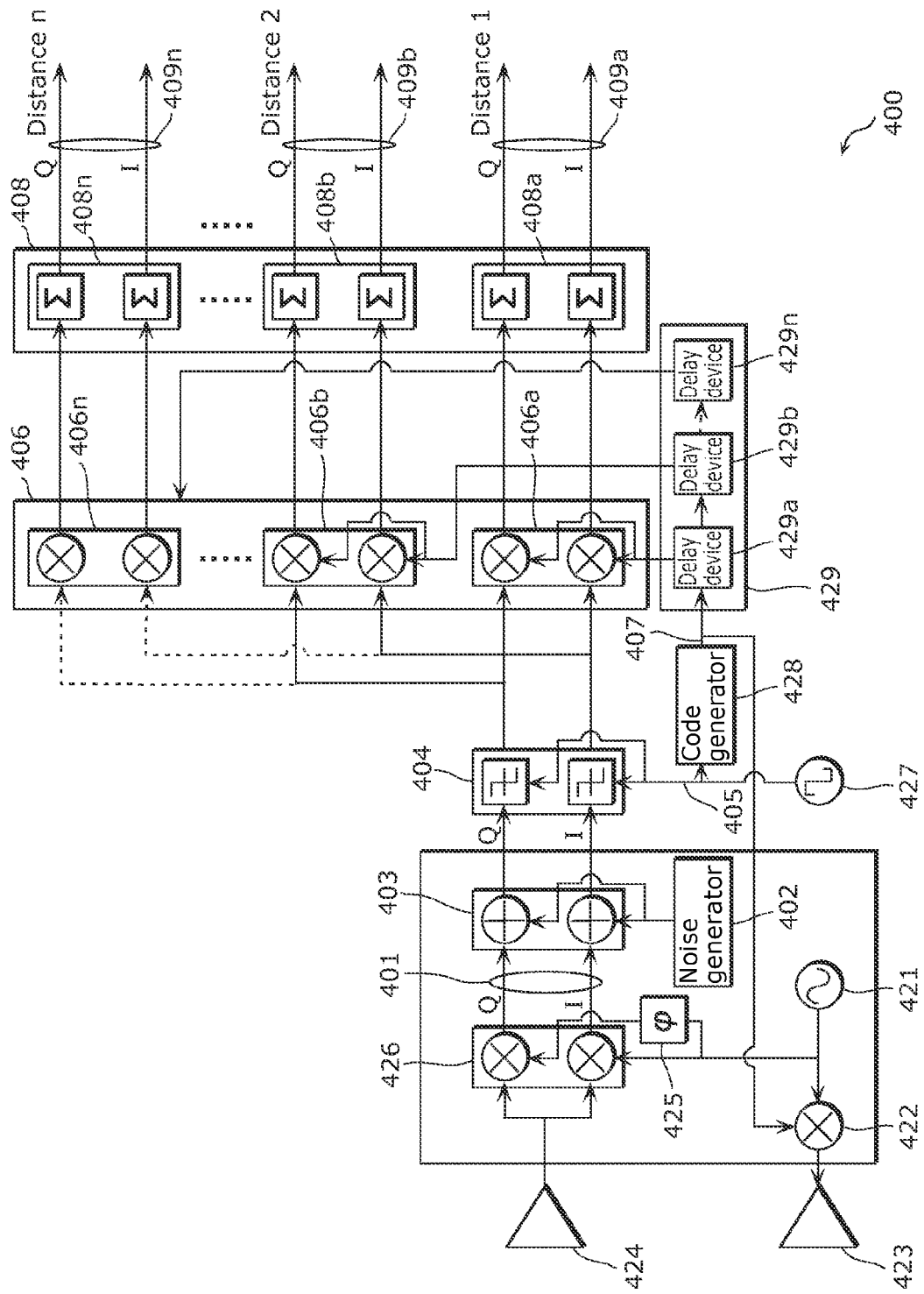
FIG. 7 is a block diagram showing an example of a configuration of the radar apparatus according to Embodiment 2.

FIG. 7 is a block diagram showing an example of a configuration of the radar apparatus according to Embodiment 2. The radar apparatus 400 shown in FIG. 7 is an example of a radar apparatus which uses a plurality of systems of the signal processing apparatuses 100 according to Embodiment 1. It should be noted that among the signal processing apparatuses 100, the noise generator 102 and the adder 103 are shared by the plurality of systems, and the multiplier 106 and the counter 108 are provided for each of the plurality of systems individually. Moreover, the noise generator 102 and the adder 103 are realized as analog circuitry, and the multiplier 106 and the counter 108 are realized as digital circuitry.

First, the overall configuration of the radar apparatus 400 will be described.

A carrier wave generated by a signal source 421 is modulated by a modulator 422 with a spread spectrum code generated by a code generator 428 synchronously with a clock signal generated by a clock source 427. The modulated carrier wave is radiated as a detection radio wave from the transmission antenna 423.

The detection radio wave is then received by a reception antenna 424 after being reflected back from an object. The received detection radio wave is transformed into a baseband signal 401 configured of an in-phase component (I) for the phase of the carrier wave and a quadrature component (Q) by a demodulator 426 detecting the received detection radio wave using the carrier wave generated by the signal source 421 and a signal of the carrier wave that has been shifted by 90 degrees by a phase shifter 425. Next, a noise signal generated by a noise generator 402 is added to the baseband signal by an adder 403. These processes are realized by analog circuitry on the reception side of the radar apparatus 400. It should be noted that the noise generator 402 and the adder 403 correspond to the noise generator 102 and the adder 103 according to Embodiment 1, respectively.

The following processes are performed by digital circuitry.

The baseband signal added with the noise signal is compared against a fixed voltage synchronously with a clock signal 405 by an analog comparator 404 and output with respect to each I and Q component as a logical value 1 or 0. These signals are then each logically inverted by a multiplier group 406 in accordance with the logic of a group of signals which are spread spectrum code 407 being delayed by a delay device group 429, and input in a counter group 408. In the counter group, reflection signals from an object present in range bins (range of distance from the radar apparatus 400) corresponding to the delay times are separated per I and Q component with respect to each delay, and output as range bin signals 409a and 409b through 409n. At this time, only a required number of range bins are used. As such, a corresponding number of structural elements in the multiplier group 406, delay device group 429, and counter group 408 may be provided.

In other words, the multiplier group 406, the delay device group 429, and the counter group 408 include n number of multipliers 406a through 406n, n number of delay devices 429a through 429n, and n number of counters 408a through 408n corresponding to n number of range bins (where n is an integer of 2 or more), and a multiplier, delay device, and counter of a same system correspond to a same range bin. Moreover, the plurality of delay devices included in the delay device group 429 are, for example, cascade connected, and each delay device delays by a time corresponding to 1 bit of the delay code so that the delay devices generate delay codes that correspond to mutually different range bins.

As described above, the radar apparatus 400 according to Embodiment 2 includes (i) n number of signal processing apparatuses according to Embodiment 1, (ii) a transmission unit including: the code generator 428 which generates a spread spectrum code synchronously with the clock signal; the signal source 421 which generates a carrier wave; the modulator 422 which generates a modulation signal by modulating the carrier wave with the spread spectrum code; and the transmission antenna 423 which radiates the modulation signal, (iii) a reception unit including: the reception antenna 424 which receives a reflected wave that is the modulation signal radiated by the transmission unit and reflected back from an object which reflects radio waves, and outputs a reception signal; and the demodulator 426 which generates a baseband signal by detecting the reception signal using the carrier wave, and (iv) the delay device group 429 which generates a plurality of delayed codes by delaying the spread spectrum code by a plurality of mutually different delay times, wherein the n number of signal processing apparatuses correspond to the plurality of delayed codes on a one-to-one basis, mutually receive an input of the baseband signal as the analog signal, each receive an input of a corresponding one of the plurality of delayed codes as the digital code, and output, using n number of the calculated correlation values, n number of range bin signals 409a and 409b through 409n which are digital signals indicating the reflected waves from range bins corresponding to the plurality of delayed codes, and the radar apparatus 400 calculates at least one of a speed, direction, or position of the object using the n number of output range bin signals 409a and 409b through 409n.

In other words, the radar apparatus 400 measures the range bin signals 409a and 409b through 409n, each of which is a correlation value between a signal component included in the reflected wave from a range bin and a delay code delayed by the delay device group 429, and may perform the following processes. For example, the radar apparatus 400 may calculate the speed of an object by fast Fourier transforming a time series of each range bin signal. Moreover, when the radar apparatus 400 is configured to include a plurality of reception antennas, the direction of the object may be calculated using range bin signals each of which corresponds to one of the reception antennas. Moreover, the position of an object may be calculated by determining whether an object is present in a range bin corresponding to a range bin signal of a given threshold level or larger.

It should be noted that the code generator 428, the spread spectrum code generated by the code generator 428, the signal source 421, the demodulator 426, the delay device group 429, and the range bin signals 409a and 409b through 409n are examples of the pseudo noise code generator, the pseudo noise code, the oscillator, the down-converter, the delayed code generator, and the reflection signal.

Moreover, with Embodiment 2, it is possible to concurrently generate signals for each of the range bins without sweeping the delay amount of the spread spectrum code with a reception correlation process. In this way, since the radar apparatus 400 according to Embodiment 2 has a configuration which does not require the sweeping of the delay amount of the spread spectrum code, it has the following advantages over conventional spectrum spread radar apparatuses.

With a spread spectrum radar apparatus having a conventional configuration, sweeping the reception correlation code to thoroughly measure a concerned range of distance takes time. Moreover, when one wishes to increase the sweeping rate, one must correspondingly set the passband width of the band pass filter wider. This leads to an increase in noise and degradation in sensitivity. As such, sensitivity and sweep rate have a trade-off relationship, meaning an improvement of both cannot be obtained at the same time.

Conversely, since the radar apparatus 400 according to Embodiment 2 is capable of concurrently generating signals for each range bin, it is possible to measure a concerned range of distance among range bins in parallel. In other words, the radar apparatus 400 according to Embodiment 2 is capable of rapidly measuring a concerned range of distance without widening the passband width of the band pass filter, which degrades sensitivity. That is to say, the problem with conventional spectrum spread radar apparatuses that sensitivity and measuring speed cannot be improved concurrently can be overcome without the use of a high cost, high resolution, high speed AD converter.

That is, the radar apparatus 400 according to Embodiment 2 is capable of independently measuring, for each range bin, detection radio waves reflected by an object, without sweeping the delay time, as a result of being provided with, in parallel, n number of multipliers 406a through 406n and *n* number of counters 408a through 408n configured of digital circuitry and setting each with mutually different delay times. In other words, the radar apparatus 400 according to Embodiment 2 is capable of calculating a correlation value for each range bin.

Consequently, it is possible to detect, without fail, a measurement target object, without the use of a high speed, high resolution AD converter.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the signal processing apparatus according to each of the embodiments is a program described below.

In other words, this program causes a computer to execute a method of calculating a correlation value between an input analog signal and a given digital code, the signal processing method including: adding a noise signal to the analog signal; comparing, synchronously with a clock signal having a first period, a magnitude of the analog signal added with the noise signal with a magnitude of a given voltage; calculating, synchronously with the clock signal, an exclusive OR between a comparison result from the comparing and the given digital code; and accumulating calculation results from the calculating over a second period in a time series, and calculating, as the correlation value, a difference between an accumulation result and one-half of a quotient of the second period and the first period.

The herein disclosed subject matter is to be considered descriptive and illustrative only, and the appended Claims are of a scope intended to cover and encompass not only the particular embodiments disclosed, but also equivalent structures, methods, and/or uses.

For example, the above-described signal processing apparatus includes a noise generator, but the signal processing apparatus may be realized without a noise generator and may receive and input of the noise signal from an external source.

Moreover, the digital code is not limited to M-sequence code, and may be a Gold sequence code.

Moreover, for example, a portion or all of the components of each of the preceding devices may be configured from one system LSI (Large Scale Integration) integrated circuit. These may be integrated into individual chips, or a portion or all of the components may be integrated into one chip.

This kind of integration is referred to as LSI, but, depending on the number of components per chip, may also be referred to as IC, system LSI, super LSI, or ultra LSI.

Moreover, the method of circuit integration is not limited to LSI. Integration may be realized with a specialized circuit or a general purpose processor. A Field Programmable Gate Array (FPGA) or a reconfigurable processor that allows reconfiguration of the connection or configuration of the inner circuit cells of the LSI circuit can be used for the same purpose.

Furthermore, when advancement in semiconductor technology and derivatives of other technologies brings forth a circuit integration technology which replaces LSI, it will be appreciated that such a circuit integration technology may be used to integrate the functional blocks. Application of biotechnology is also a possibility.

INDUSTRIAL APPLICABILITY

The signal processing apparatus according to one or more exemplary embodiments disclosed herein and radar apparatuses equipped therewith are applicable as radar apparatuses for hazard avoidance integrated into various types of devices such as automobiles, watercrafts, airplanes, and robots, as radar apparatuses in security systems for detecting suspicious individuals, as well as measurement apparatuses for measuring the optical characteristics of objects.

The invention claimed is:

1. A signal processing apparatus which calculates a correlation value between an input analog signal and a given digital code, the signal processing apparatus comprising:
    a noise adder which adds a noise signal to the analog signal;
    a comparator which compares, synchronously with a clock signal having a first period, a magnitude of the analog signal added with the noise signal with a magnitude of a given voltage;
    a multiplier which receives an input of a comparison result from the comparator and the given digital code and calculates, synchronously with the clock signal, an exclusive OR between the comparison result and the given digital code; and
    a counter which accumulates calculation results from the multiplier over a second period in a time series, and calculates, as the correlation value, a difference between an accumulation result and one-half of a quotient of the second period and the first period.

2. The signal processing apparatus according to claim 1, wherein the second period is more than two times as long as a cycle period of the digital code.

3. The signal processing apparatus according to claim 1, wherein the digital code is an M-sequence code, and
    the quotient of the second period and the first period is greater than one-tenth of a square of a total number of codes included in one period of the digital code.

4. The signal processing apparatus according to claim 1, further comprising
    a noise generator which includes a reverse-biased P-N junction diode and generates the noise signal.

5. The signal processing apparatus according to claim 4, further comprising
    a control unit configured to control the noise generator to reduce an amplitude of the noise signal within a range wherein the correlation value does not become saturated.

6. The signal processing apparatus according to claim 1, wherein a frequency component of the noise signal includes a frequency band greater than or equal to a frequency that is half a frequency of the clock signal.

7. A radar apparatus comprising:
    a plurality of the signal processing apparatuses according to claim 1;
    a transmission unit including: a pseudo noise code generator which generates a pseudo noise code synchronously with the clock signal; an oscillator which generates a carrier wave; a modulator which generates a modulation signal by modulating the carrier wave with the pseudo noise code; and a transmission antenna which radiates the modulation signal;
    a reception unit including: a reception antenna which receives a reflected wave that is the modulation signal radiated by the transmission unit and reflected back from an object which reflects radio waves, and outputs a reception signal; and a down-converter which generates a baseband signal by detecting the reception signal using the carrier wave; and
    a delayed code generator which generates a plurality of delayed codes by delaying the pseudo noise code by a plurality of mutually different delay times,
    wherein the plurality of signal processing apparatuses correspond to the plurality of delayed codes on a one-to-one basis, mutually receive an input of the baseband signal as the analog signal, each receive an input of a corresponding one of the plurality of delayed codes as the digital code, and output, using a plurality of the correlation values calculated by the counter, a plurality of reflection signals which are digital signals indicating the reflected waves from ranges of distance corresponding to the plurality of delayed codes, and the radar apparatus calculates at least one of a speed, direction, or position of the object using the plurality of reflection signals output by the plurality of signal processing apparatuses.

* * * * *